US012662048B2

(12) United States Patent
Jaeger et al.

(10) Patent No.: US 12,662,048 B2
(45) Date of Patent: Jun. 23, 2026

(54) STRUCTURED LIGHTING SYSTEM

(71) Applicant: GENTEX CORPORATION, Zeeland, MI (US)

(72) Inventors: Sebastien C. Jaeger, Saugatuck, MI (US); Yoav Zuta, Tel-Aviv (IL); Keith W. Bigoness, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 256 days.

(21) Appl. No.: 18/470,576

(22) Filed: Sep. 20, 2023

(65) Prior Publication Data

US 2024/0092259 A1 Mar. 21, 2024

Related U.S. Application Data

(60) Provisional application No. 63/376,486, filed on Sep. 21, 2022.

(51) Int. Cl.
*B60Q 3/80* (2017.01)
*B60Q 3/258* (2017.01)
(Continued)

(52) U.S. Cl.
CPC ................ *B60Q 3/80* (2017.02); *B60Q 3/74* (2017.02); *B60R 1/29* (2022.01); *B60Q 3/258* (2017.02); *B60R 2300/8006* (2013.01)

(58) Field of Classification Search
CPC . B60Q 3/80; B60Q 3/74; B60Q 3/258; B60Q 2300/054; B60R 1/29;
(Continued)

(56) References Cited

U.S. PATENT DOCUMENTS

2007/0189749 A1 8/2007 Aoki et al.
2019/0178635 A1 6/2019 Ge et al.
(Continued)

FOREIGN PATENT DOCUMENTS

JP 2007218626 A 8/2007
JP 2008518195 A 5/2008
(Continued)

OTHER PUBLICATIONS

Search Report dated Jan. 8, 2024, for corresponding PCT application No. PCT/US2023/074628, 3 pages.
(Continued)

*Primary Examiner* — Renan Luque
(74) *Attorney, Agent, or Firm* — Price Heneveld LLP; Brian James Brewer

(57) ABSTRACT

According to one aspect of the present disclosure, a system is disclosed. The system may comprise a light assembly, an imager, and/or a controller. The light assembly may be configured to emit an array of illumination elements onto a scene. The imager may be configured to capture one or more images of the illumination elements projected onto the scene. The controller may be configured to selectively activate the light assembly between a first state and a second state. In the first and second sates, respectively, first and second groups of the illumination elements are selectively activated to emit first and second patterns of illumination elements.

12 Claims, 11 Drawing Sheets

(51) Int. Cl.
    *B60Q 3/74*        (2017.01)
    *B60R 1/29*        (2022.01)

(58) Field of Classification Search
    CPC .......... B60R 2300/8006; G06V 10/145; G06V
                            10/141; G06V 20/59
    See application file for complete search history.

(56)                 References Cited

U.S. PATENT DOCUMENTS

| | | |
|---|---|---|
| 2019/0249984 A1 | 8/2019 | Barlev et al. |
| 2020/0045297 A1 | 2/2020 | Van Der Sijde et al. |
| 2021/0160457 A1 | 5/2021 | Amiram et al. |
| 2022/0028099 A1 | 1/2022 | Kantor et al. |
| 2023/0161041 A1* | 5/2023 | Schindler .............. G01S 7/4816 |
| | | 356/615 |
| 2023/0288193 A1* | 9/2023 | Hamid Muhammed .................... |
| | | G03B 17/54 |
| 2025/0063244 A1* | 2/2025 | Bole ........................ B60Q 3/74 |

FOREIGN PATENT DOCUMENTS

| | | |
|---|---|---|
| JP | 2016540189 A | 12/2016 |
| KR | 10-2020-0068165 A | 6/2020 |
| KR | 10-2021-0037253 A | 4/2021 |
| KR | 10-2022-0067164 A | 5/2022 |
| WO | 2021259923 A1 | 12/2021 |

OTHER PUBLICATIONS

Written Opinion dated Jan. 8, 2024, for corresponding PCT application No. PCT/US2023/ 074628, 4 pages.

\* cited by examiner

110

112

20

20

111

111

STRUCTURED LIGHTING SYSTEM

CROSS REFERENCE TO RELATED APPLICATIONS

This application claims priority under 35 U.S.C. § 119(e) to U.S. Provisional Application No. 63/376,486 filed on Sep. 21, 2022, entitled "Structured Lighting System," the disclosure of which is hereby incorporated by reference in its entirety.

FIELD OF INVENTION

The present invention relates, in general, to imaging systems and, more particularly, to imaging systems with structured lighting.

SUMMARY

In accordance with the present disclosure, problems associated with structure lighting systems have been substantially reduced or eliminated.

According to one aspect of the present disclosure, a system is disclosed. The system may comprise a light assembly, an imager, and/or a controller. The light assembly may be configured to emit a linear array of illumination elements onto a scene. The imager may be configured to capture one or more images of the illumination elements projected onto the scene. The controller may be configured to selectively activate the light assembly between: a first state and a second state. In the first state, the first group of the illumination elements may be selectively activated to emit a first pattern of illumination elements. In the second state, a second group of the illumination elements may be selectively activated to emit a second pattern of the illumination elements.

In some instances, the first pattern of illumination elements may be a substantially linear pattern and the second pattern of illumination elements is a non-linear pattern. In some embodiments, the first group of illumination elements may be all or substantially all of the illumination elements. In some embodiments, the second the second group of illumination elements may be a sub-group of the first group of illumination elements. In other embodiments, the first group of illumination elements is a sub-group of the first group of illumination elements.

In other instances, the first and second patterns of illumination elements may be substantially linear patterns. In some embodiments, the second group of illumination elements may be a sub-group of the first group of illumination elements. In some embodiments, the first and second groups of illumination elements may correspond to substantially different areas of the scene. In some such embodiments, the first and second groups of illumination elements may substantially overlap a common area of the scene. In other such embodiments, the first and second groups of illumination elements may correspond to mutually exclusive areas of the scene.

In other instances, the first and second pattern of illumination elements may be substantially non-linear patterns. In some embodiments, the second group of illumination elements may be a sub-group of the first group of illumination elements. In some embodiments, the first and second groups of illumination elements may correspond to substantially different areas of the scene. In some such embodiments, the first and second groups of illumination elements may overlap a common area of the scene. In other such embodiments, the first and second groups of illumination elements may correspond to mutually exclusive areas of the scene.

In some instances, the scene may correspond to a vehicle interior. Further, the first and second groups of illumination elements may correspond to substantially different areas of the scene, such that the first group of illumination elements substantially corresponds to a driver's area of the scene and the second group of illumination elements substantially corresponds to a passenger's area of the scene.

In some embodiments, the controller may be further configured to selectively activate the light assembly between a third state in addition to the first and second states. In the third state, a third group of illumination elements may be selectively activated to emit a third pattern of illumination elements. In some embodiments, the second and third groups are sub-groups of the first group of illumination elements. In some such embodiments, the second and third groups of illumination elements may correspond to different areas of the scene. In some embodiments, the first pattern of illumination elements is a linear pattern.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

Figure 1:
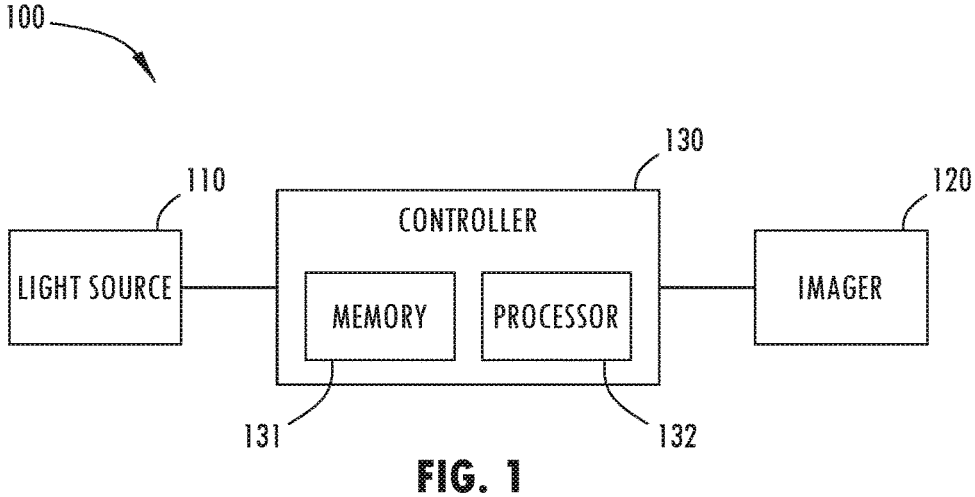
FIG. 1 is a schematic representation of an embodiment of a system.
Figure 2:
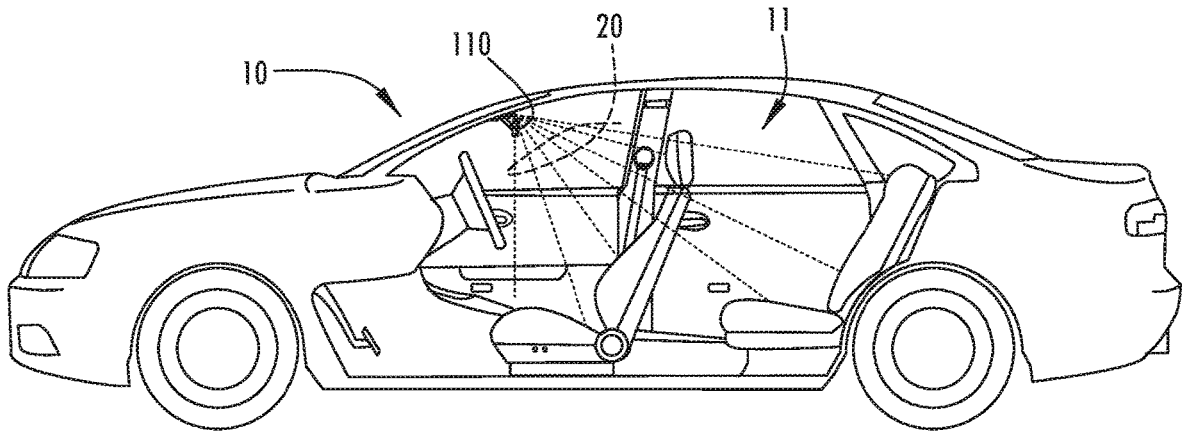
FIG. 2 is a schematic representation of various aspects of a system disposed in a vehicle.

The present disclosure is directed to a system 100, as illustrated in FIG. 1, and the components thereof, illustrated in FIGS. 1-4E. System 100 may comprise a light assembly 110, an imager 120, and/or a controller 130. In some embodiments, system 100 may be associated with a vehicle 10. Specifically, system 100 may be substantially disposed in a cabin 11 of vehicle 10. Accordingly, system 100 may be a driver and/or cabin monitoring system.

Light assembly 110 may be configured to emit light 20 having a first wavelength range. In some embodiments, light assembly 110 may be part of a rearview assembly of vehicle 10. An example of light assembly 110 is shown in FIGS. 3A-E. The light may be emitted by one or more light emitter 111. Additionally, light assembly 110 may have an optical element 112 for receiving and/or transmitting the light from the one or more light emitters 111. The emitted light may illuminate at least part of a scene 30. The illumination may be at an eye-safe, low power level. In some embodiments, scene 30 may be a vehicle interior. Accordingly, scene 30, for example, may correspond to a passenger compartment, a driver seat, a front passenger seat, a front row, and or a second row of vehicle 10. In some embodiments, scene 30 may substantially correspond to a field of view of imager 120. The first wavelength range may include or be substantially limited to light in the infra-red and/or near infra-red regions of the electromagnetic spectrum. In some embodiments, the first wavelength range may be substantially centered around 810, 850, or 940 nm.

Additionally, light 20 emitted by light assembly 110 may be structured light. Accordingly, emitted light 20 may illuminate scene 30 with a pattern of illumination elements 113. The structured light illumination is illustrated on a static planar scene 30 in FIGS. 4A-E to illustrate various illumination element patterns. The illumination elements 113, for example, maybe dots, spots, lines, shapes, and/or combinations thereof. As such, the illumination elements 113 may be projected onto scene 30 and on objects there within. In some embodiments, the pattern of illumination elements 113 may be a substantially linear array. In other embodiments, the pattern of illumination elements 113 may be non-linear. As such, the pattern of illumination elements 113 may be quasi-random. Further, the pattern of illumination elements may be divided into two or more sub-groups of illumination elements 113. Each sub-group may be different than one another. In some embodiments, the sub-groups may be mutually exclusive of one another. In other embodiments, the sub-groups may not be mutually exclusive of one another. In some embodiments, the emitted light 20 of the illumination elements 113 may be substantially in-phase and/or coherent.

In some embodiments, one or more of the light emitters 111 may be a laser. A light emitter 111, for example, may be one or more vertical cavity surface emitting laser (VCSEL).

Accordingly, light assembly 110 may comprise a VCSEL array. In some such embodiments, the VCSEL may be a single-mode VCSEL.

Further, light assembly 110 may have one or more optical element 112. Optical element 112 may be diffusive, diffractive, and/or refractive. In some embodiments, optical element 112 may be configured to split a beam or beams of light into a structured light pattern. Thus, optical element 112 may be a diffraction grating. In some embodiments, one or more of the light emitters 111 may be associated with and/or disposed within an optical element 112 substrate. The optical element 112 substrate, for example may be GaAs (gallium arsenide). Accordingly, an array of VCSELs may be disposed within a GsAs substrate.

Additionally, as shown in FIGS. 3A-E, either individually or in groups, light emitters 111 may be selectively activated, and achieve various illumination element 113 patterns, as shown in the corresponding FIGS. 4A-E. Accordingly, light emitters 111 may be addressable. As such, light assembly 110 may be configured to selectively activate one or more groups of light emitters 111. Therefore, corresponding illumination elements 113 emitted by respective light emitters 111 may be selectively emitted, together and/or individually. Accordingly, light assembly 100 may be configured to operate between a first state, a second state, a third state, fourth state, and/or a fifth state by activating a corresponding group of collection of groups of illumination elements 111. In some embodiments, scene 30 may be defined as an area of which illumination elements 113 may substantially cover when all activated.

Figure 3A:
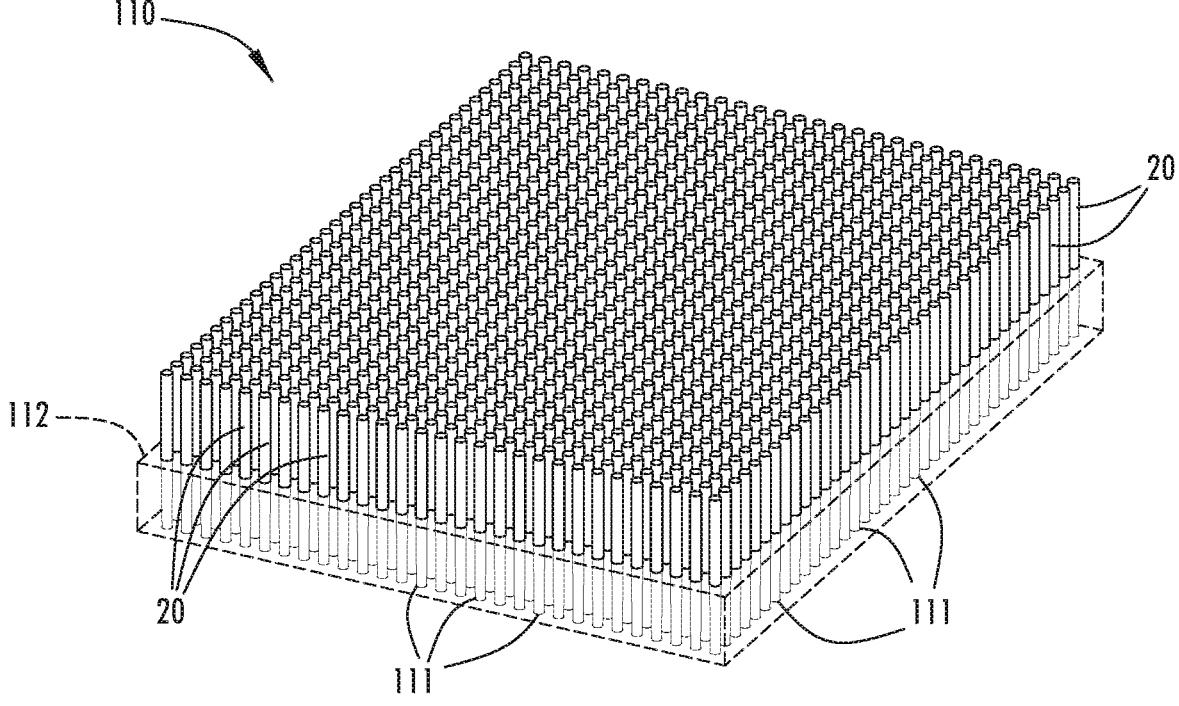
FIG. 3A is a schematic representation of a light assembly in a first state activating a first group of light emitters to form a first group of illumination elements in a linear pattern.
Figure 4A:
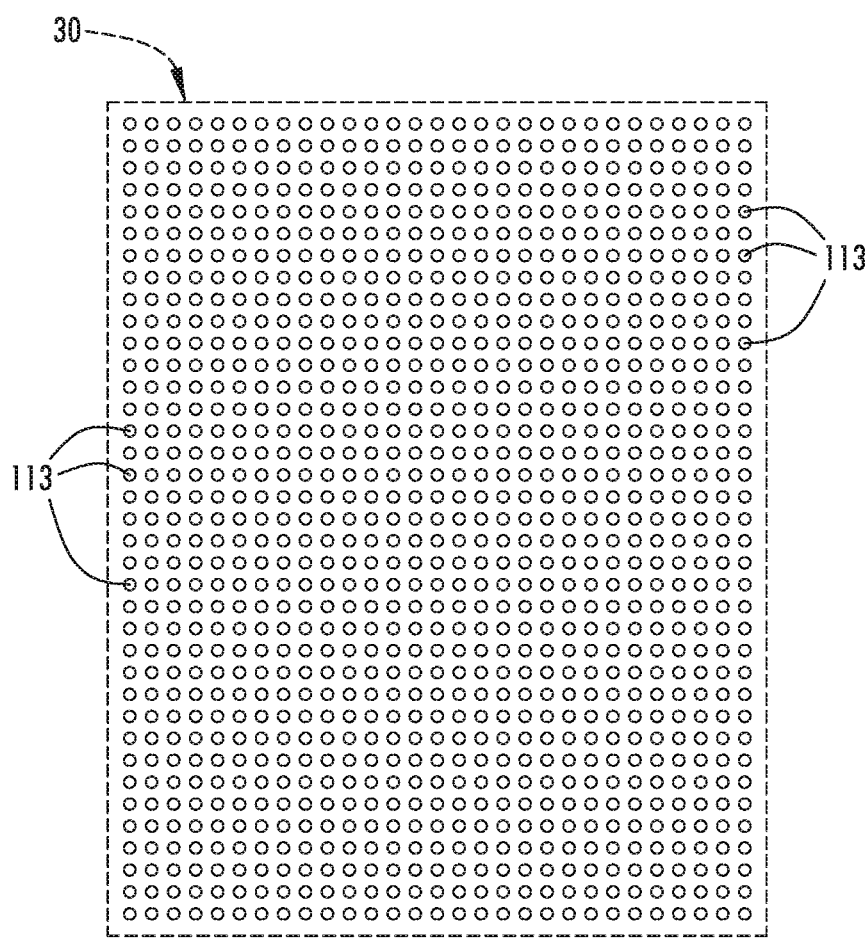
FIG. 4A is a schematic representation of a first group of illumination elements forming a linear pattern illuminated on to a static planar scene.

In the first state, as shown in FIG. 3a, light assembly 110 may be configured to emit light 20 forming a first group of illumination elements 113. Additionally, the first group may be all or substantially all of the illumination elements 113, as shown in FIG. 4a. In some embodiments, the first group of illumination elements 113 may be arranged in a substantially linear pattern. In other embodiments, the first group of illumination elements 113 may be arranged in a substantially non-linear pattern. As such, the second group of illumination elements 113 may be arranged in a quasi-random pattern. In some embodiments, scene 30 may be defined as an area substantially covered by illumination elements 113 when light assembly 110 is in the first state.

Figure 3B:
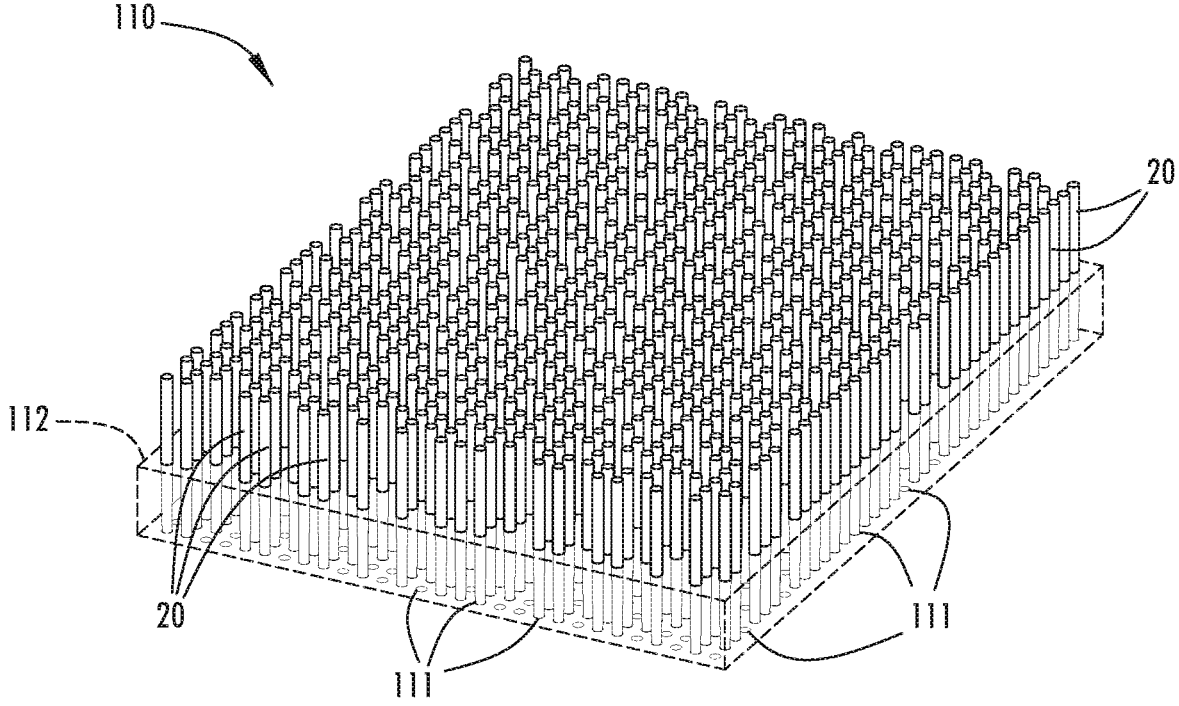
FIG. 3B is a schematic representation of a light assembly in a second state activating a second group of light emitters to form a second group of illumination elements in a quasi-random pattern.
Figure 4B:
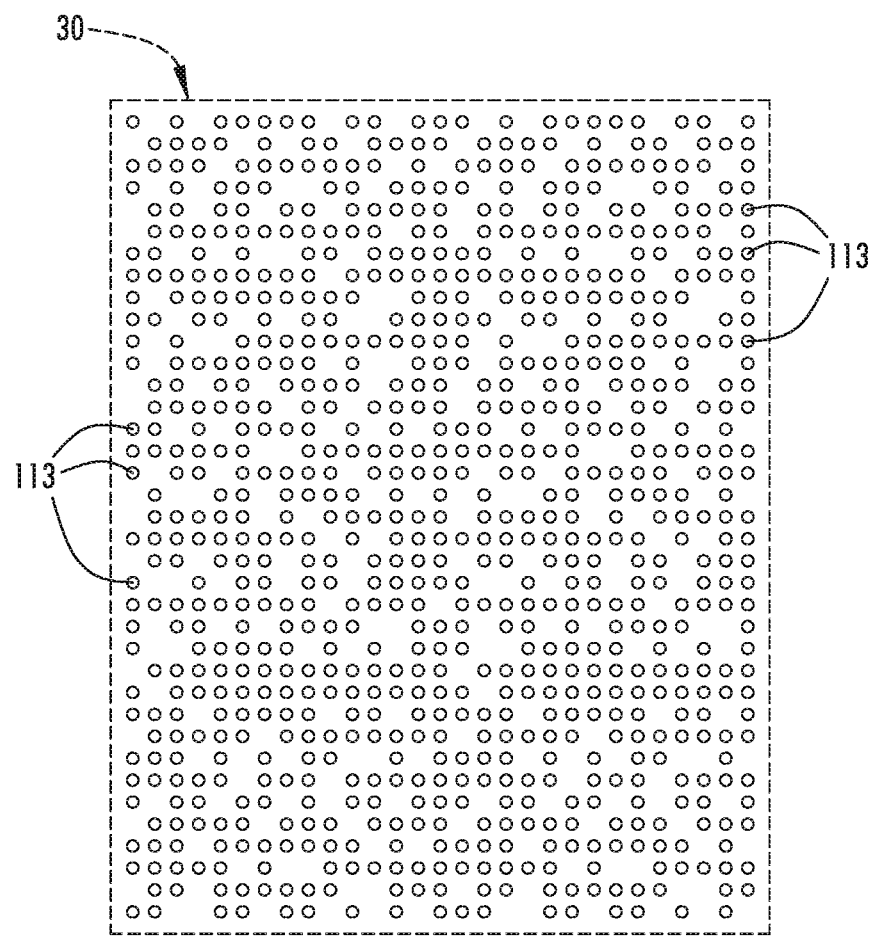
FIG. 4B is a schematic representation of a second group of illumination elements forming a quasi-random pattern illuminated onto a static planar scene.

In the second state, as shown in FIG. 3b, light assembly 110 may be configured to emit light 20 forming a second group of the illumination elements 113, as shown in FIG. 4b. The second group may be substantially less than all of the illumination elements 113. Accordingly, in some embodiments, the second group of illumination elements 113 may be smaller than and/or included within the first group of illumination elements 113. As such, the second group of illumination elements 113 may be a sub-group of illumination elements 113 of the first group of illumination elements 113. Further, the second group of illumination elements 113 may be arranged in a substantially non-linear pattern. As such, the second group of illumination elements 113 may be arranged in a quasi-random pattern. In some embodiments, the second group of illumination elements 113 may substantially span across an eternity of scene 30. In other embodiments, the second group of illumination elements 113 may be substantially confined to a first portion of scene 30. The first portion of scene 30 may be substantially less than an entirety of scene 30.

Figure 3C:
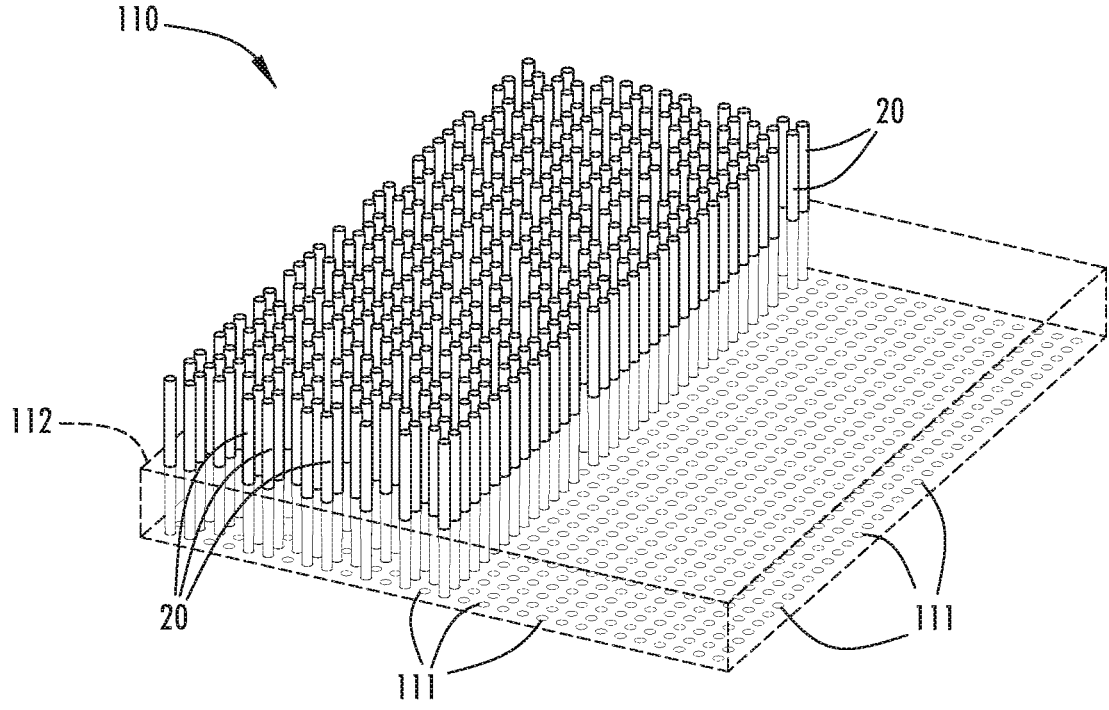
FIG. 3C is a schematic representation of a light assembly in a third state activating a third group of light emitters to form a third group of illumination elements in a quasi-random pattern.
Figure 4C:
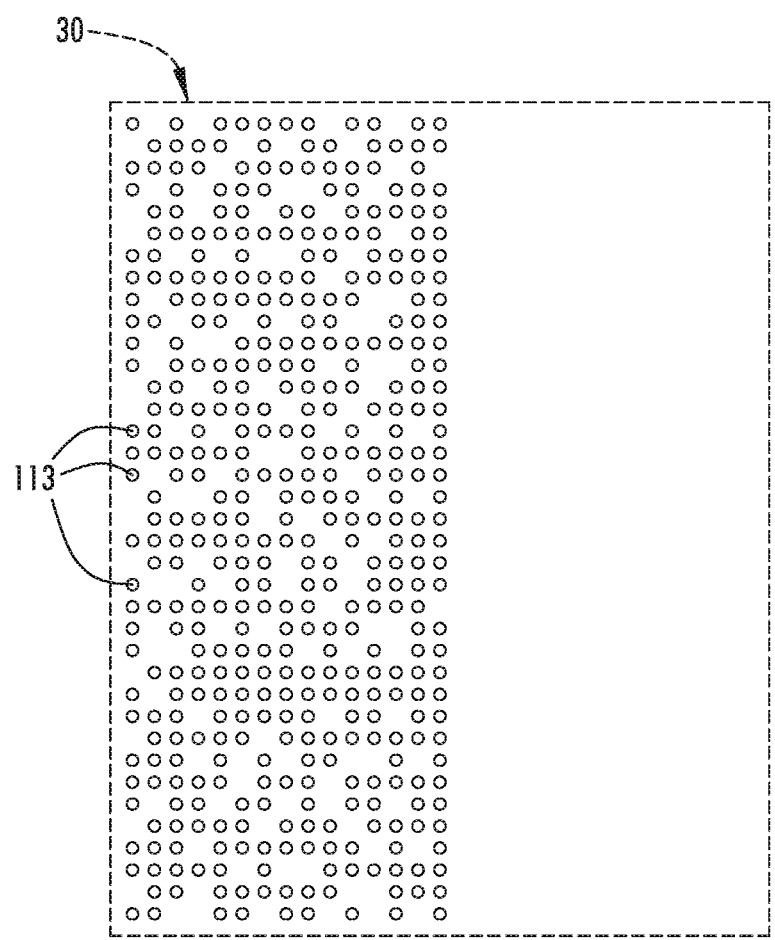
FIG. 4C is a schematic representation of a third group of illumination elements forming a quasi-random pattern illuminated onto a static planar scene.

In the third state, as shown in FIG. 3c, light assembly 110 may be configured to emit light forming a third group of the illumination elements 113, as shown in FIG. 4c. The third group illumination elements 113 may be substantially less than all of the illumination elements 113. Accordingly, in some embodiments, the third group of illumination elements 113 may be smaller than and/or included within the first and/or the second group of illumination elements 113. As such, the third group of illumination elements 113 may be a sub-group of illumination elements 113 of the first and/or the second group of illumination elements 113. Further, the third group of illumination elements 113 may be arranged in a substantially non-linear pattern. As such, the third group of illumination elements 113 may be arranged in a quasi-random pattern.

Additionally, the third group of illumination elements 113 may be substantially different than the second group of illumination elements 113. In some embodiments, the third group of illumination elements 113 may be substantially equal in size to the second group of illumination elements 113. Furthermore, in some embodiments, the third group of illumination elements 113 may be substantially confined to a second portion of scene 30. The second portion of scene 30 may be substantially less than an eternity of scene 30. Additionally, the second portion of scene 30 may be substantially different than the first portion of scene 30. Further, the first and second portions of scene 30 may be substantially overlapping or substantially mutually exclusive. Accordingly, the second and third groups of illumination elements 113 may have some common illumination elements 113 or be mutually exclusive of one another.

In some embodiments, the second and third groups of illumination elements 113, together, may substantially equate to the first group of illumination elements 113. As such, the second and third groups of illumination elements 113, together, may include all or substantially all of the illumination elements 113. In other embodiments, the second and third groups of illumination elements 113, together, may equate to substantially less than all of the illumination elements 113.

Figure 3D:
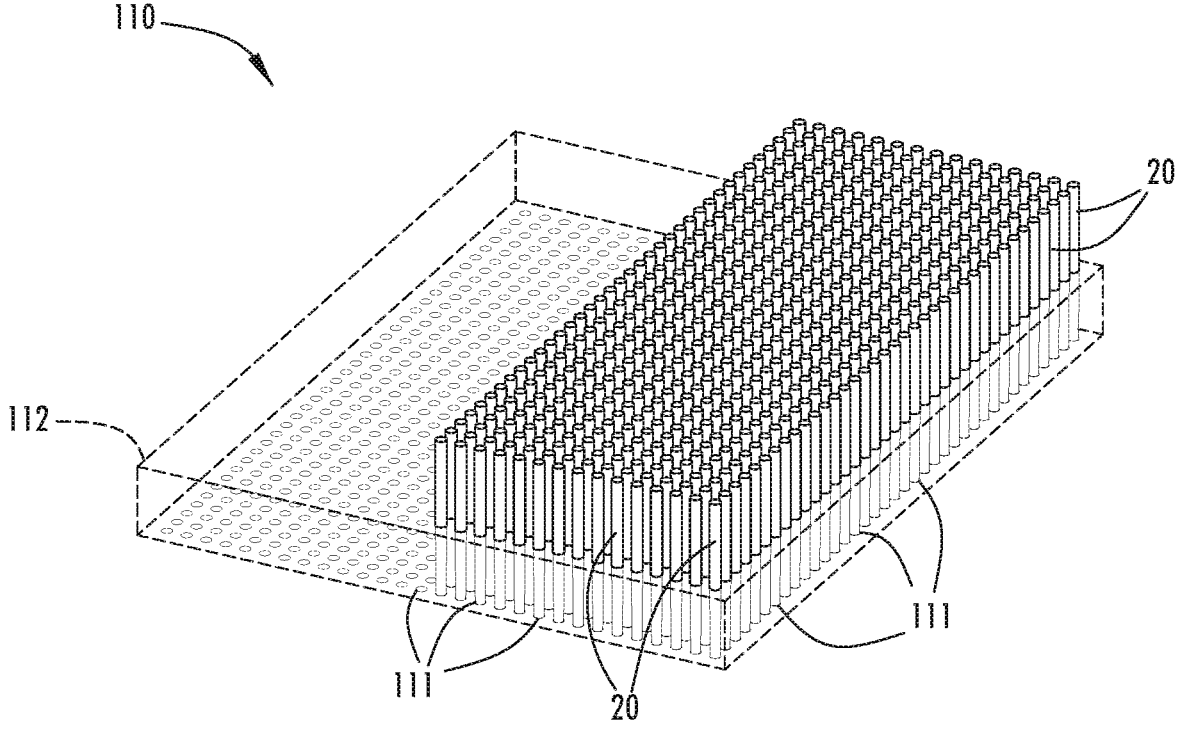
FIG. 3D is a schematic representation of a light assembly in a fourth state activating a fourth group of light emitters to form a fourth group of illumination elements in a linear pattern.
Figure 4D:
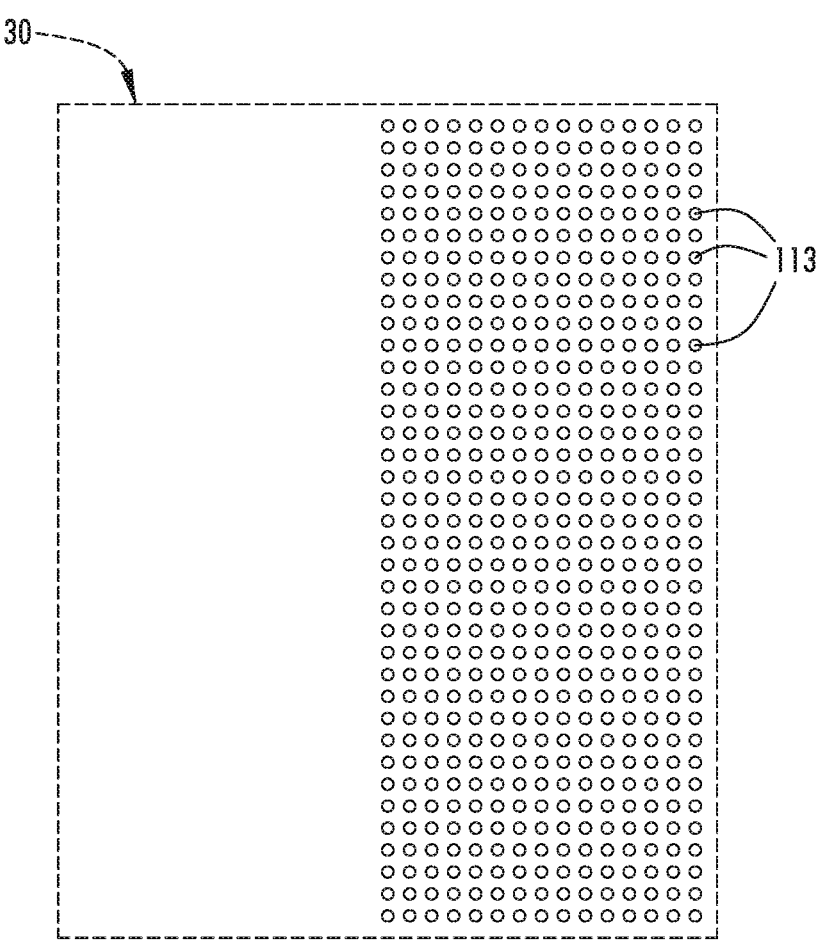
FIG. 4D is a schematic representation of a fourth group of illumination elements forming a linear pattern illuminated onto a static planar scene.

In the fourth state, as shown in FIG. 3d, light assembly 110 may be configured to emit light 20 forming a fourth group of illumination elements 113, as shown in FIG. 4d. The fourth group of illumination elements 113 may also be substantially less than all of the illumination elements 113. Accordingly, in some embodiments, the fourth group of illumination elements 113 may be smaller than and/or included within the first group of illumination elements 113. As such, the fourth group of illumination elements 113 may be a sub-group of illumination elements 113 of the first group of illumination elements 113. Further, the fourth group of illumination elements 113 may be arranged in a substantially linear pattern. In some embodiments, the fourth group of illumination elements 113 may include a selection of adjacent illumination elements 113 from the first group of illumination elements 113. In other embodiments, the fourth group of illumination elements 113 may include a selection of non-adjacent illumination elements 113 from the first group of illumination elements 113. For example, illumination elements 113 of the fourth group may amount to every other or every third, etc., of an area of the illumination elements 113 of the first group. In some embodiments, the fourth group of illumination elements 113, may be substantially confined to a third portion of scene 30. The third portion of scene 30 may be substantially less than an entirety of scene 30. In some embodiments, the third portion may be substantially equal to the first or second portions of scene 30. In other embodiments, the third portion may be substantially different that the first and second portions of scene 30.

Figure 3E:
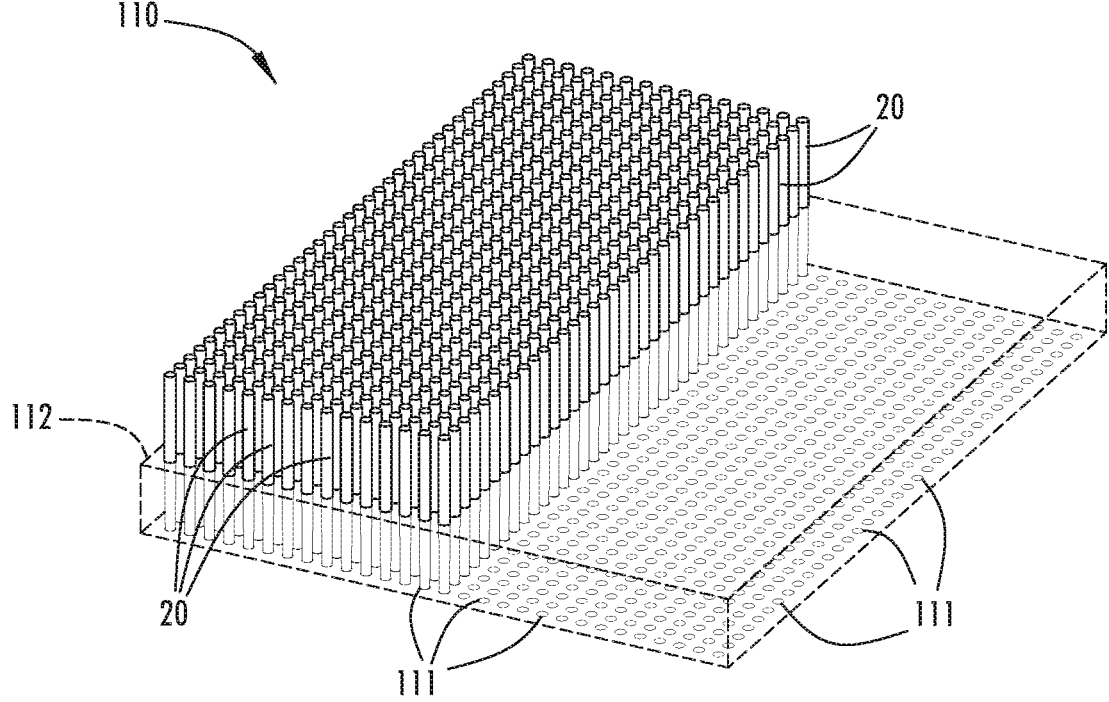
FIG. 3E is a schematic representation of a light assembly in a fifth state activating a fifth group of light emitters to form a fifth group of illumination elements in a linear pattern.
Figure 4E:
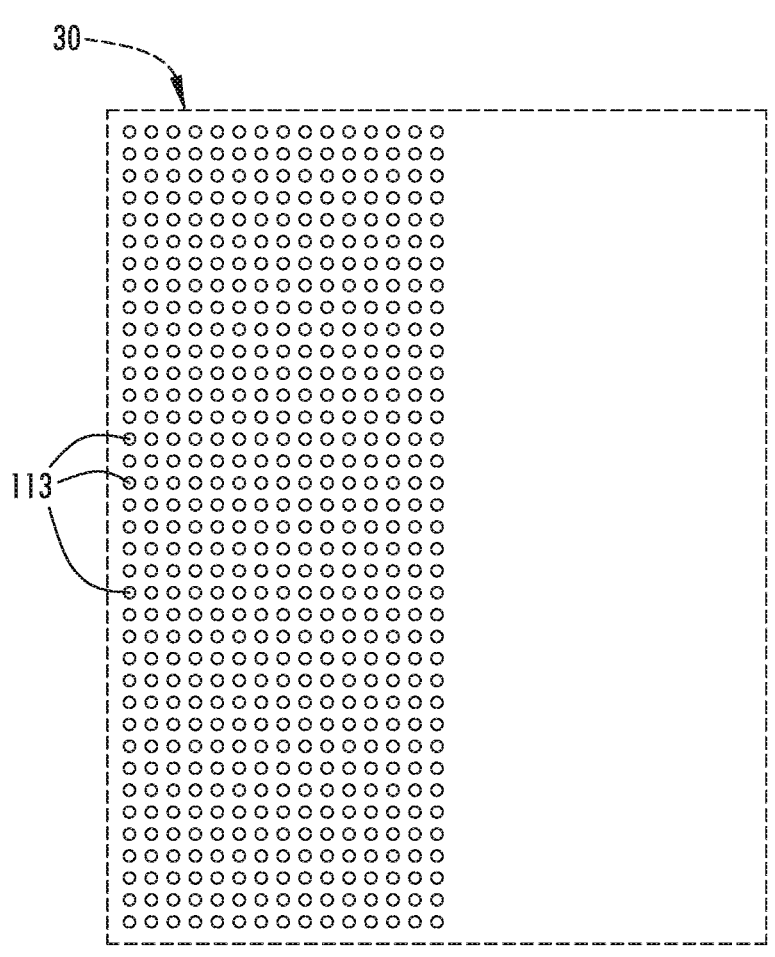
FIG. 4E is a schematic representation of a fifth group of illumination elements forming a linear pattern illuminated onto a static planar scene.

In the fifth state, as shown in FIG. 3e, light assembly 110 may be configured to emit light 20 forming a fifth group of illumination elements 113, as shown in FIG. 4e. The fifth group of illumination elements 113 may also be substantially less than all of the illumination elements 113. Accordingly, in some embodiments, the fifth group of illumination elements 113 may be smaller than and/or included within the first group of illumination elements 113. As such, the fifth group of illumination elements may be a sub-group of illumination elements 113 of the first group of illumination elements 113. Further, the fifth group of illumination elements 113 may be arranged in a substantially linear pattern. In some embodiments, the fourth group of illumination elements 113 may include a selection of adjacent illumination elements 113 from the first group of illumination elements 113. In other embodiments, the fourth group of illumination elements 113 may include a selection of non-adjacent illumination elements 113 from the first group of illumination elements 113. For example, illumination elements 113 of the fourth group may amount to every other or every third, etc., of an area of the illumination elements 113 of the first group.

Additionally, the fifth group of illumination elements 113 may be different than the fourth group of illumination elements 113. In some embodiments, the fifth group of illumination elements 113 may be substantially equal in size to the fourth group of illumination elements 113. Furthermore, in some embodiments, the fifth group of illumination elements 113 may be substantially confined to a fourth portion of scene 30. The fourth portion may be substantially less than an eternity of scene 30. In some embodiments, the fourth portion of scene 30 may be substantially equal to the first or second portions of scene 30. In other embodiments, the fourth portion of scene 30 may be substantially different than the first and second portions of scene. Additionally, the fourth portion of scene 30 may be different than third portion of scene 30. Further, the third and fourth portions of scene 30 may be substantially overlapping or substantially mutually exclusive. Accordingly, the fourth and fifth groups of illumination elements 113 may have some common illumination elements 113 or be mutually exclusive of one another.

In some embodiments, the fourth and fifth groups of illumination elements 113, together, may include all or substantially equate to the first group of illumination elements 113. As such, the fourth and fifth groups of illumination elements 113, together, may include all or substantially all of the illumination elements 113. In other embodiments, the fourth and fifth groups of illumination elements 113, together, may equate to substantially less than all of the illumination elements 113.

Imager 120 may be any device configured to capture light in a second wavelength range and generate one or more corresponding images. For example, imager 120 may be camera. Accordingly, imager 120 may be a Semi-Conductor Charge-Coupled Device (CCD) or a pixel sensor of Complementary Metal-Oxide-Semi-Conductor (CMOS) technologies. The second wavelength range may include all or part of the first wavelength range. Thus, the second wavelength range may include or be substantially limited to light in the infra-red and/or near infra-red regions of the electromagnetic spectrum. In some embodiments, the second wavelength range may be substantially centered around 810, 850, or 940 nm. In some embodiments, imager 120 may have a field of view of the scene. Further, imager 120 may be configured to generate the images based, at least in part, on the reflected illumination from light assembly 110 off of the scene and/or objects within. Accordingly, the one or more images may capture one or more of the illumination elements 113 illuminated onto scene 30. In some embodiments, imager 120 may be associated with an interior rearview assembly of vehicle 10.

Controller 130 may be communicatively connected to imager 120 and/or light assembly 110. Accordingly, controller 130 may be configured to switch light assembly 110 between the first, second, third, fourth, and/or fifth sates. Additionally, controller 130 may be configured to receive the one or more images from imager 120. Further, controller 130 may comprise a memory 131 and a processor 132.

Memory 131 may be a non-transitory computer-readable media (CRM). Accordingly, memory 131 may be a tangible device may be configured to store one or more instructions, such as one or more algorithms, to provide for the configuration and operation of controller 130. Examples of memory 131 include conventional hard disks, solid-state memories, random access memories (RAM), read-only memory (ROM), erasable programmable read-only memory (EPROM), electronically erasable programmable read-only memory (EEPROM), optical or magnetic disks, dynamic random-access memory (DRAM).

Processor 132 may be communicatively connected to memory 131. Further, processor 132 may be any device or electronic circuit configured and/or operable to process or execute one or more sets of electronic instructions, such as the algorithm. These instructions may be stored in memory 131. Examples of processor 132 may include a central processing unit (CPU), a microprocessor, and/or an application specific integrated circuit (ASIC).

In some embodiments, controller 130 may be configured to create a depth map of scene 30. Controller 130 may be configured to compare the one or more images against a calibration image, which illustrates illumination elements 113 illuminating scene 30. The calibration image may provide controller 130 with an understanding of the pattern of the structured light. The depth data may be extracted from the one or more images based on triangulation of one of more of the reflected illumination elements relative others. For example, controller 130 generate the depth map in accordance with the teachings of U.S. Pat. No. 11,310,466, which is herein incorporated by reference.

In some embodiments, controller 130 may be configured to detect vibrations of surfaces illuminated with the illumination elements 113, based, at least in part, on the one or more illumination elements 113 captured in the images. Vibration or movement of a surface may cause relevant illumination elements 113 to change in their reflected intensity, due to constructive and/or destructive interference. As such, the reflected illumination elements 113 may form a changing speckle pattern. Therefore, the surface vibrations may be derived from changes or shifts in light intensity of one or more of the illumination elements 113 in a series of the images. For example, controller 130 may be configured to follow the intensity of each of one or more of the illumination elements 113 over time and analyze its variance. In embodiments where system 100 is fixedly attached to the vehicle, system 100 vibrates therewith and as such, will only measure motion relative to itself. For example, controller 130 may detect the vibrations in accordance with the teachings of U.S. Pat. No. 11,310,466, which is herein incorporated by reference.

Embodiments of the present disclosure may have various advantages. For example, embodiments where light assembly 110 is configured to emit illumination elements 113 in a linear pattern in one state and emit illumination elements 113 in a non-linear pattern in another state may specifically have the advantage of utilizing functionalities enabled by each of these lighting patterns with a single light assembly and without having to choose pattern type or the other. For example, the non-linear pattern may provide for depth mapping by allowing the triangulation or location of a surface illuminated with an illumination element 113 based on its unique relationship to other illumination elements 113. Additionally, the linear pattern may provide for an increased number of illumination elements 113, giving vibration sensing greater sensitivity and/or accuracy, because each dot may provide its own measurement. Further, the linear pattern may be used for 2D imaging due to its more homogenized illumination relative the non-linear patterned light assembly. Furthermore, in embodiments where light assembly 110 is configured to illuminate in two states corresponding to different areas of the scene, system 100 may have the advantage of being operable to conduct depth mapping or vibration sensing across the entire scene, but also being configured to focus on an area of interest and reduce or eliminate an exposure of the illumination to other areas of the scene. This may be particularly beneficial in instances where humans or animals occupy parts of the scene.

In this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

As used herein, "communicatively connected" may mean connected directly or indirectly though one or more electrical components.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A system comprising:

a light assembly configured to emit an array of illumination elements onto a scene;

an imager configured to capture one or more images of the illumination elements projected onto the scene, wherein the scene corresponds to a vehicle interior; and a controller configured to selectively activate the light assembly between:

a first state where a first group of the illumination elements are selectively activated to emit a first pattern of illumination elements, and a second state where a second group of the illumination elements are selectively activated to emit a second pattern of the illumination elements, wherein the first and second groups of illumination elements correspond to substantially different areas of the scene, wherein the first group of illumination elements substantially corresponds to a driver's area of the scene, and wherein the second group of illumination elements substantially corresponds to a passenger's area of the scene, wherein the first pattern of illumination elements is a substantially linear pattern and the second pattern of illumination elements is a non-linear pattern.

2. The system of claim 1, wherein the first group of illumination elements is all or substantially all of the illumination elements.

3. The system of claim 1, wherein the second the second group of illumination elements is a sub-group of the first group of illumination elements.

4. The system of claim 1, wherein the first group of illumination elements is a sub-group of the first group of illumination elements.

5. A system comprising:

a light assembly configured to emit an array of illumination elements onto a scene;

an imager configured to capture one or more images of the illumination elements projected onto the scene, wherein the scene corresponds to a vehicle interior; and a controller configured to selectively activate the light assembly between:

a first state where a first group of the illumination elements are selectively activated to emit a first pattern of illumination elements, and a second state where a second group of the illumination elements are selectively activated to emit a second pattern of the illumination elements, wherein the first and second groups of illumination elements correspond to substantially different areas of the scene, wherein the first group of illumination elements substantially corresponds to a driver's area of the scene, and wherein the second group of illumination elements substantially corresponds to a passenger's area of the scene, wherein the first and second patterns of illumination elements are substantially linear patterns, and wherein the second group of illumination elements is a sub-group of the first group of illumination elements.

6. The system of claim 5, wherein the first and second groups of illumination elements correspond to substantially different areas of the scene.

7. The system of claim 6, wherein the first and second groups of illumination elements substantially overlap a common area of the scene.

8. The system of claim 6, wherein the first and second groups of illumination elements correspond to mutually exclusive areas of the scene.

9. A system comprising:

a light assembly configured to emit an array of illumination elements onto a scene;

an imager configured to capture one or more images of the illumination elements projected onto the scene, wherein the scene corresponds to a vehicle interior; and a controller configured to selectively activate the light assembly between:

a first state where a first group of the illumination elements are selectively activated to emit a first pattern of illumination elements, and a second state where a second group of the illumination elements are selectively activated to emit a second pattern of the illumination elements, wherein the first and second groups of illumination elements correspond to substantially different areas of the scene, wherein the first group of illumination elements substantially corresponds to a driver's area of the scene, and wherein the second group of illumination elements substantially corresponds to a passenger's area of the scene;

wherein:

the controller is further configured to selectively activate the light assembly to a third state;

in the third state, a third group of illumination elements is selectively activated to emit a third pattern of illumination elements; and the second and third groups are sub-groups of the first group of illumination elements.

10. The system of claim 9, wherein the second and third groups of illumination elements correspond to different areas of the scene.

11. The system of claim 9, wherein the first pattern of illumination elements is a linear pattern.

12. The system of claim 11, wherein the second pattern of illumination elements is a non-linear pattern.

* * * * *